US011886137B2

(12) United States Patent
Nakamoto et al.

(10) Patent No.: US 11,886,137 B2
(45) Date of Patent: Jan. 30, 2024

(54) FIXING DEVICE AND IMAGE FORMING APPARATUS INCLUDING THERMISTOR AND THERMOSTAT ALIGNED IN A SHEET CONVEYANCE DIRECTION

(71) Applicant: KYOCERA Document Solutions Inc., Osaka (JP)

(72) Inventors: Fumito Nakamoto, Osaka (JP); Masakazu Uehara, Osaka (JP); Hironori Takahashi, Osaka (JP); Tomohiro Watatani, Osaka (JP); Yuhiro Sakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/753,285

(22) PCT Filed: Aug. 24, 2020

(86) PCT No.: PCT/JP2020/031868
§ 371 (c)(1),
(2) Date: Feb. 25, 2022

(87) PCT Pub. No.: WO2021/039733
PCT Pub. Date: Mar. 4, 2021

(65) Prior Publication Data
US 2022/0350282 A1 Nov. 3, 2022

(30) Foreign Application Priority Data
Aug. 29, 2019 (JP) ................................ 2019-157029

(51) Int. Cl.
*G03G 15/20* (2006.01)

(52) U.S. Cl.
CPC ..... *G03G 15/2053* (2013.01); *G03G 15/2032* (2013.01); *G03G 15/2039* (2013.01); *G03G 2215/2038* (2013.01)

(58) Field of Classification Search
CPC ....................................... G03G 15/2039–2046
See application file for complete search history.

(56) References Cited

U.S. PATENT DOCUMENTS 9,002,249 B2 4/2015 Uekawa et al.
10,809,651 B2 * 10/2020 Furuichi ............ G03G 15/2053
(Continued)

FOREIGN PATENT DOCUMENTS

JP H06-282059 A 10/1994
JP 2004-309693 A 11/2004
(Continued)

*Primary Examiner* — Arlene Heredia
(74) *Attorney, Agent, or Firm* — Studebaker & Brackett PC

(57) ABSTRACT

A fixing device (50) includes a fixing belt (70), a pressure member (80), and a heating section (90). The heating section (90) faces an inner peripheral surface of the fixing belt (70). The heating section (90) includes a heater (HT), a first heat sensitive body (SM11), and a second heat sensitive body (SM21). The second heat sensitive body (SM21) differs from the first heat sensitive body (SM11). The heater (HT) has a first heater portion (AE1). The first heater portion (AE1) is one end portion of a pair of end portions of the heater (HT) in a longitudinal direction thereof. The first heat sensitive body (SM11) and the second heat sensitive body (SM21) face the first heater portion (AE1) and are aligned in a conveyance direction (DC) of a sheet (S).

7 Claims, 10 Drawing Sheets

(56) References Cited

U.S. PATENT DOCUMENTS

| | | | | |
|---|---|---|---|---|
| 11,042,109 | B2 * | 6/2021 | Kikuchi | G03G 15/2053 |
| 11,237,505 | B2 * | 2/2022 | Kikuchi | G03G 15/2039 |
| 11,250,302 | B1 * | 2/2022 | Kinouchi | G06K 15/14 |
| 11,281,137 | B2 * | 3/2022 | Endo | G03G 15/2053 |
| 11,402,773 | B2 * | 8/2022 | Taguchi | G03G 15/2053 |
| 11,531,297 | B2 * | 12/2022 | Kikuchi | G03G 15/205 |
| 11,537,070 | B2 * | 12/2022 | Adachi | G03G 15/2053 |
| 2013/0272762 | A1 | 10/2013 | Uekawa et al. | |
| 2020/0174407 | A1 * | 6/2020 | Furuichi | G03G 15/2039 |
| 2022/0043377 | A1 * | 2/2022 | Endo | G03G 15/2042 |

FOREIGN PATENT DOCUMENTS

| | | | |
|---|---|---|---|
| JP | 2013-218195 | A | 10/2013 |
| JP | 2014-199470 | A | 10/2014 |

* cited by examiner

FIXING DEVICE AND IMAGE FORMING APPARATUS INCLUDING THERMISTOR AND THERMOSTAT ALIGNED IN A SHEET CONVEYANCE DIRECTION

TECHNICAL FIELD

The present invention relates to a fixing device and an image forming apparatus.

BACKGROUND ART

A fixing device described in Patent Literature 1 includes a fixing assembly and a pressure roller. The fixing assembly includes a fixing film (fixing belt), a heater, and a temperature detecting element (heat sensitive body). The heater comes into contact with the inner face of the fixing film and heats a fixing nip portion. The temperature detecting element detects the temperature of the heater. The temperature of the fixing nip portion is kept at a target temperature based on an output signal of the temperature detecting element. The temperature detecting element is arranged on the surface of a ceramic substrate which constitutes the heater. That is, the temperature detecting element is arranged inside the fixing film.

CITATION LIST

Patent Literature

[Patent Literature 1]

Japanese Patent Application Laid-Open Publication No. 2013-218195

SUMMARY OF INVENTION

Technical Problem

However, a plurality of temperature detecting elements may be used to detect the temperature of the heater at a plurality of locations. In this case, not all of the temperature detecting elements can be installed inside the fixing film, and one or more of the temperature detecting elements may be installed outside the fixing film. Accordingly, the work of installing the temperature detecting elements becomes complicated. It is also necessary to secure space for installing temperature detecting elements outside the fixing film.

The present invention takes into account the aforementioned problem, and an object thereof is to provide a fixing device and an image forming apparatus in which heat sensitive bodies can be installed inside a fixing belt without installing a heat sensitive body outside of the fixing belt.

Solution to Problem

A fixing device according to an aspect of the present invention fixes a toner image formed on a sheet to the sheet. The fixing device includes a fixing belt, a pressure member, and a heating section. The pressure member pressibly makes contact with the fixing belt and rotates around an axis of rotation. The heating section faces an inner peripheral surface of the fixing belt. The heating section includes a heater, a heater holding member, a first heat sensitive body, and a second heat sensitive body. The heater heats the fixing belt. The heater holding member holds the heater. The first heat sensitive body is arranged on the heater holding member. The second heat sensitive body differs from the first heat sensitive body, and is arranged on the heater holding member. The heater has a first heater portion. The first heater portion is one end portion of a pair of end portions of the heater in a longitudinal direction thereof. The first heat sensitive body and the second heat sensitive body face the first heater portion and are aligned in a conveyance direction of the sheet.

An image forming apparatus according to another aspect of the present invention includes an image forming section and the above fixing device. The image forming section forms a toner image on a sheet. The fixing device fixes the toner image to the sheet.

Advantageous Effects of Invention

According to the fixing device and the image forming apparatus of the present invention, heat sensitive bodies can be installed inside a fixing belt without installing a heat sensitive body outside the fixing belt.

DESCRIPTION OF EMBODIMENTS

Figure 1:
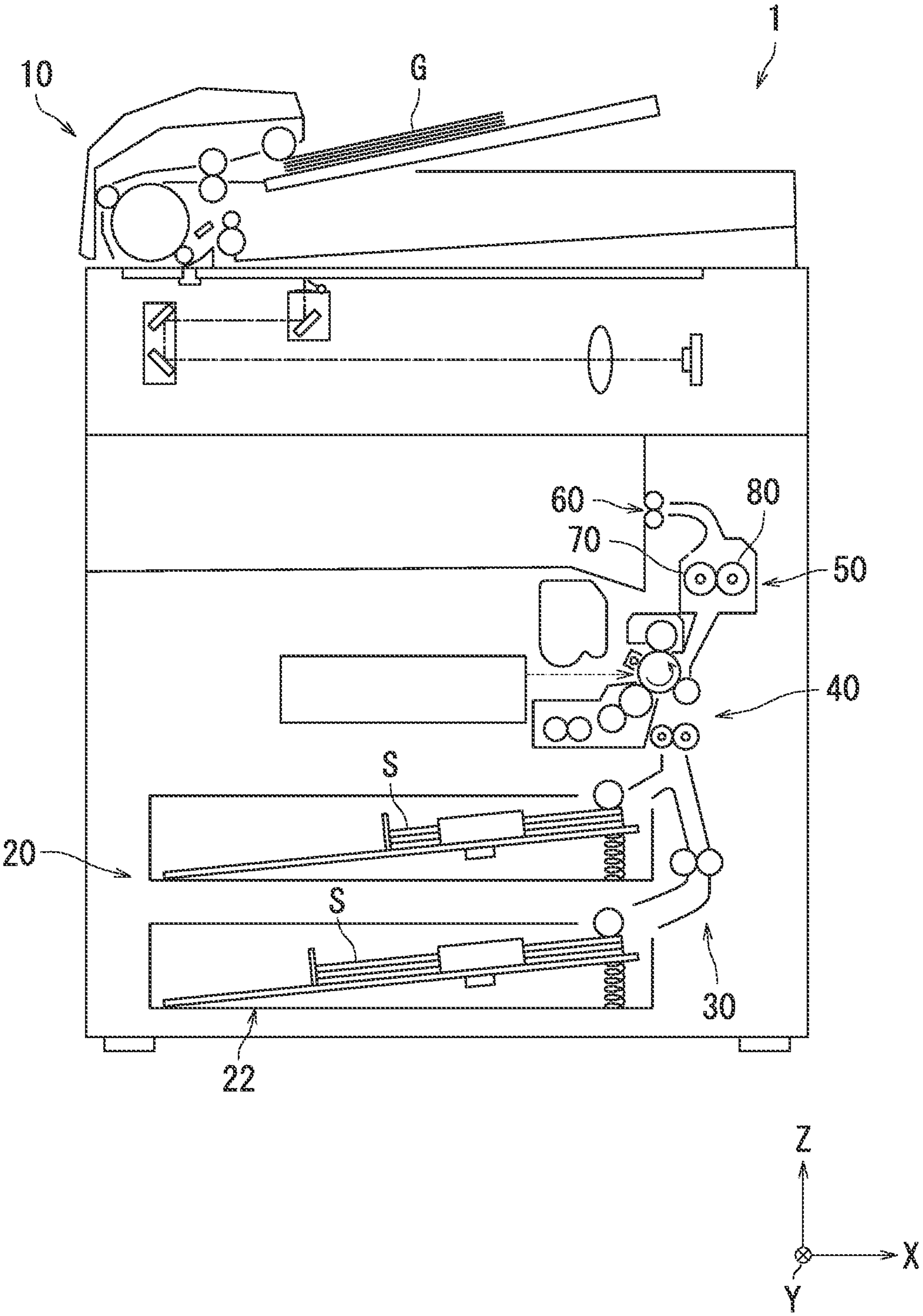
FIG. 1 is a schematic cross-sectional view of an image forming apparatus according to an embodiment of the present invention.

The following describes an embodiment of the present invention with reference to the accompanying drawings. Note that elements which are the same or equivalent are labeled with the same reference signs in the drawings and description thereof is not repeated. Furthermore, X and Y axes of a three-dimensional Cartesian coordinate system are parallel to a horizontal direction, and a Z-axis is parallel to a vertical direction in the present embodiment.

First, an image forming apparatus 1 according to the embodiment of the present invention is described with reference to FIG. 1. FIG. 1 is a schematic cross-sectional view of the image forming apparatus 1. Examples of the image forming apparatus 1 include a copier, a printer, a facsimile machine, and a multifunction peripheral which combines the functions of the foregoing. In the following, an embodiment is described in which the image forming apparatus 1 is a monochrome multifunction peripheral.

As illustrated in FIG. 1, the image forming apparatus 1 includes a reading section 10, a feeding section 20, a conveyance section 30, an image forming section 40, a fixing device 50, and an ejection section 60.

The reading section 10 reads an image of a document G. The reading section 10 generates image data from the read image. The reading section 10 includes a scanner, for example. The feeding section 20 houses a plurality of sheets S and feeds the sheets S to the conveyance section 30 a sheet at a time. The feeding section 20 includes a cassette and a pickup roller, for example. A sheet S is a sheet made of paper or synthetic resin, for example. The conveyance section 30 conveys the sheet S to the image forming section 40. The conveyance section 30 includes a plurality of conveyance rollers, for example.

The image forming section 40 electrographically forms a toner image on the sheet S. Specifically, the image forming section 40 includes a photosensitive drum, a charger, a light exposure device, a development device, a replenishing device, a transfer device, a cleaning device, and a static elimination device. The charger charges the photosensitive drum to a prescribed potential. The light exposure device outputs laser light based on image data to expose the photosensitive drum, thus forming an electrostatic latent image on the photosensitive drum according to the image data. The development device supplies toner to the electrostatic latent image on the photosensitive drum to develop the electrostatic latent image, thus forming a toner image on the photosensitive drum. The replenishing device replenishes toner to the development device. The transfer device transfers the toner image on the photosensitive drum to the sheet S. The cleaning device removes residual toner remaining on the photosensitive drum after transfer. The static elimination device removes residual charge from the photosensitive drum.

The conveyance section 30 conveys the sheet S to which the toner image has been transferred to the fixing device 50. That is, the conveyance section 30 conveys the sheet S with the toner image formed thereon to the fixing device 50.

The fixing device 50 applies heat and pressure to the toner image formed on the sheet S to fix the toner image to the sheet S. The conveyance section 30 conveys the sheet S with the toner image fixed thereto to the ejection section 60. The ejection section 60 ejects the sheet S out of the image forming apparatus 1.

Figure 2:
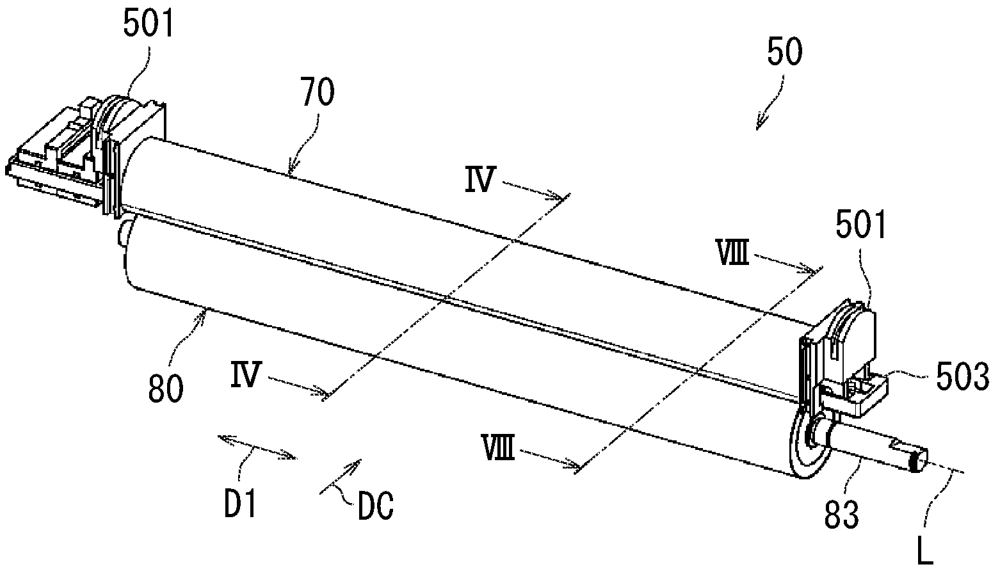
FIG. 2 is a perspective view of a fixing device according to the present embodiment.

Next, the fixing device 50 is described with reference to FIGS. 2 to 4. FIG. 2 is a perspective view of the fixing device 50. As illustrated in FIG. 2, the fixing device 50 includes a fixing belt 70, a pressure member 80, and a pair of belt holding members 501.

The fixing belt 70 is an endless belt, has a substantially cylindrical shape, and is flexible. The fixing belt 70 extends in a first direction D1. The first direction D1 indicates a direction in which an axis of rotation L of the pressure member 80 extends. The first direction D1 is substantially orthogonal to a conveyance direction DC of the sheet S.

The fixing belt 70 has a plurality of layers. The fixing belt 70 is configured, for example, by forming a polyimide layer and further forming a mold release layer on the polyimide layer. The mold release layer is a heat resistant film made of fluororesin, for example.

The pair of belt holding members 501 holds a pair of ends of the fixing belt 70 in the first direction D1.

The pressure member 80 applies pressure to the fixing belt 70 by pressibly making contact with the outer circumferential surface of the fixing belt 70 and rotates around the axis of rotation L. The pressure member 80 extends in the first direction D1. The pressure member 80 is a pressure roller in the present embodiment.

The pressure member 80 is substantially columnar. The pressure member 80 has a substantially columnar core bar 83, a cylindrical elastic layer (not illustrated), and a mold release layer (not illustrated). The elastic layer is formed on the core bar 83, and the mold release layer is formed so as to cover the surface of the elastic layer. The core bar 83 is formed of stainless steel or aluminum, for example. The axis of rotation L passes through the core bar 83. The elastic layer is elastic and is formed of silicone rubber, for example. The mold release layer is formed of fluororesin, for example.

Figure 3:
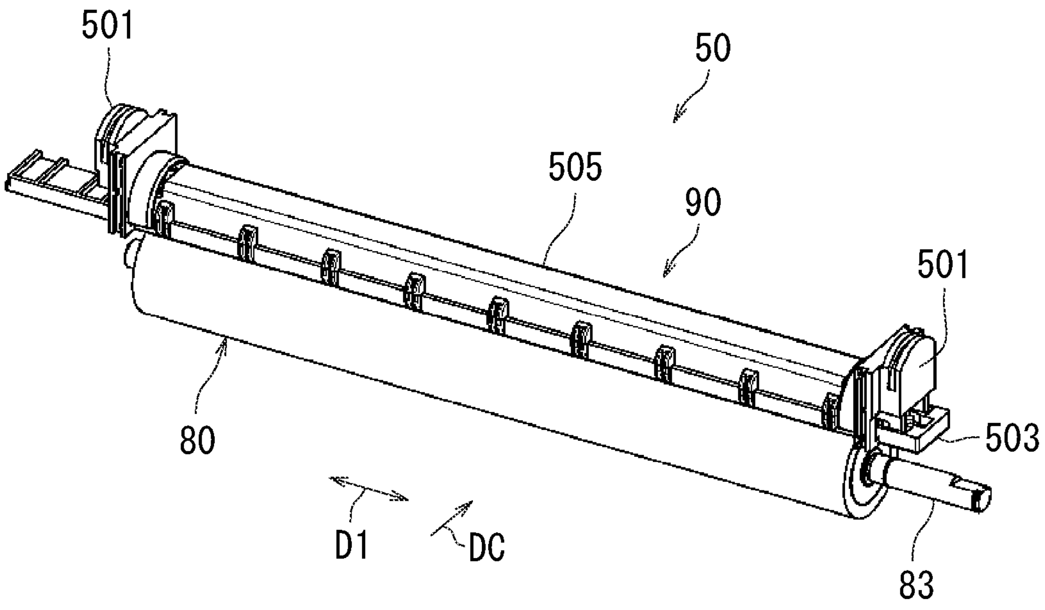
FIG. 3 is a perspective view of the fixing device of the present embodiment in a state in which a fixing belt has been removed therefrom.

FIG. 3 is a perspective view of the fixing device 50 in a state in which the fixing belt 70 has been removed therefrom. As illustrated in FIG. 3, the fixing device 50 further includes a heating section 90. The heating section 90 heats the fixing belt 70 (FIG. 2).

The heating section 90 includes a heater holding member 503 and a reinforcing member 505. The heater holding member 503 extends in the first direction D1. The heater holding member 503 is made of heat-resistant resin, for example.

The reinforcing member 505 reinforces the heater holding member 503. The reinforcing member 505 extends in the first direction D1. The reinforcing member 505 is an elongated metal stay member, for example.

Figure 4:
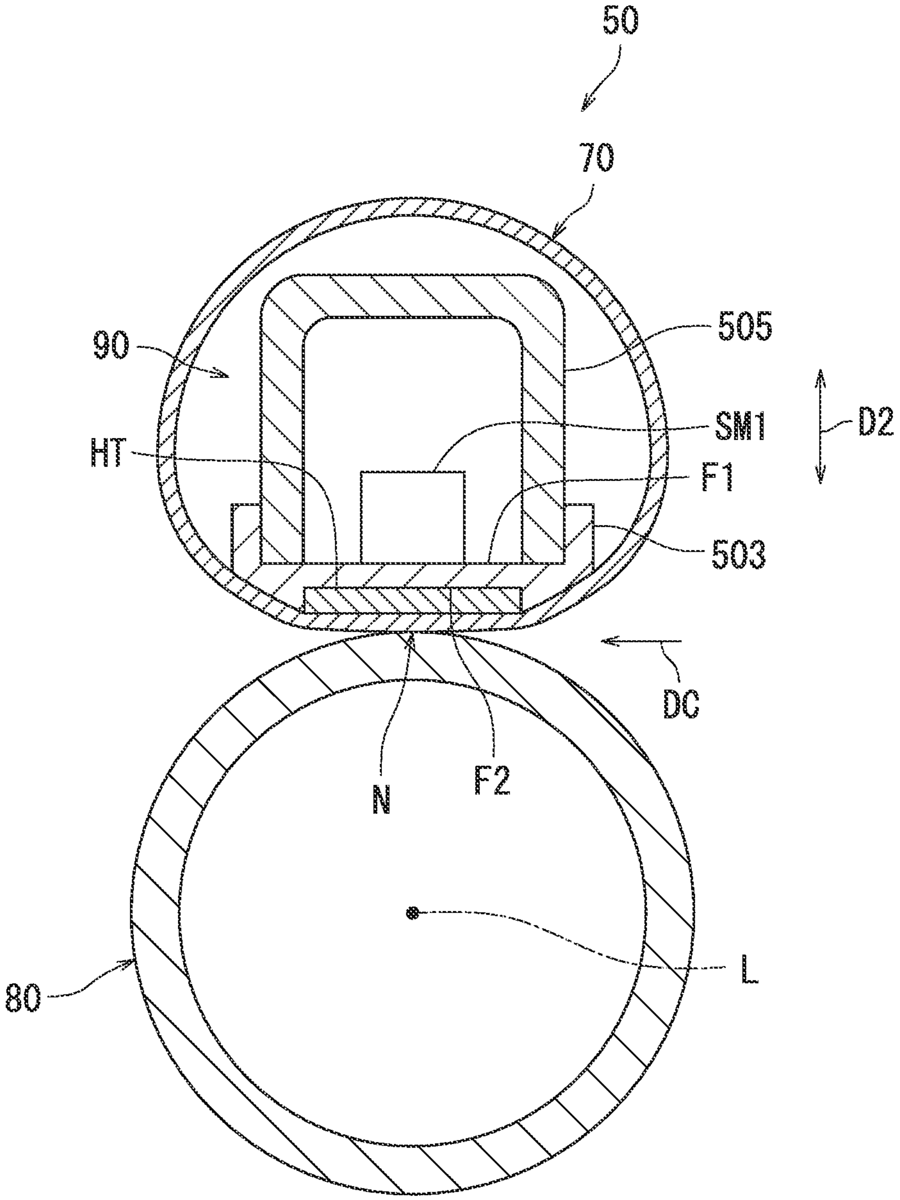
FIG. 4 is a cross-sectional view taken along a line IV-IV in FIG. 2.

FIG. 4 is a cross-sectional view taken along a line IV-IV in FIG. 2. In FIG. 4, the internal structure of the pressure member 80 is omitted to simplify the drawing.

As illustrated in FIG. 4, the heating section 90 faces the inner peripheral surface of the fixing belt 70. The heating section 90 further includes a heater HT. The heater HT heats the fixing belt 70. The heater HT is in contact with the inner peripheral surface of the fixing belt 70.

The heater holding member 503 holds the heater HT. Specifically, the heater holding member 503 has a first surface F1 and a second surface F2. The first surface F1 and the second surface F2 face each other in a second direction D2. The second surface F2 is closer to the pressure member 80 than the first surface F1. The heater HT is arranged on the second surface F2.

The pressure member 80 faces the fixing belt 70 in the second direction D2. The second direction D2 is substantially orthogonal to the conveyance direction DC of the sheet S and the first direction D1 (FIG. 3). The second direction D2 is also substantially orthogonal to the heater HT.

The pressure member 80 pressibly makes contact with the fixing belt 70. Accordingly, the pressure member 80 presses against the heater HT through the fixing belt 70.

A fixing nip part N is formed at the location where the pressure member 80 pressibly makes contact with the fixing belt 70. When the pressure member 80 is driven and rotated, the fixing belt 70 is driven and rotated with the pressure member 80. Accordingly, the sheet S is conveyed in the conveyance direction DC and passes through the fixing nip part N. As a result, the toner image is melted and fixed on the sheet S.

Figure 5:
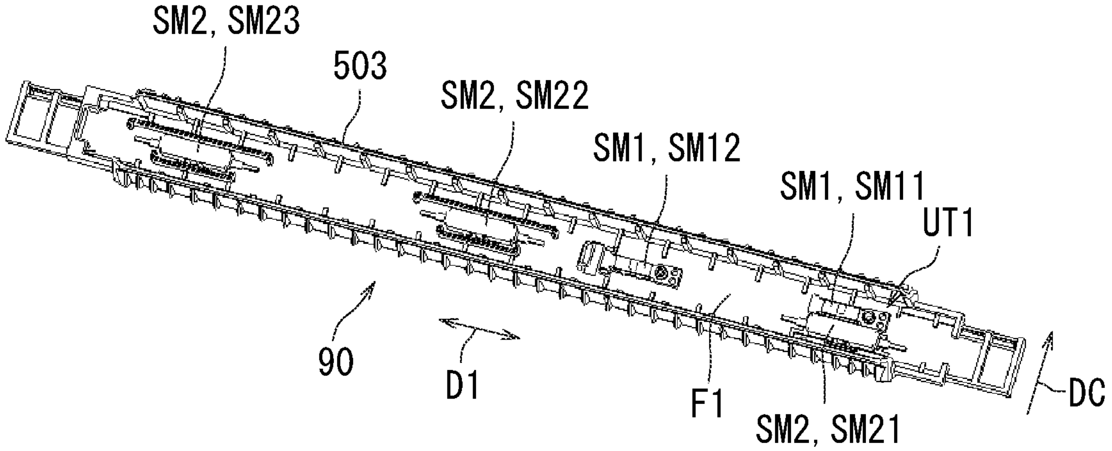
FIG. 5 is a perspective view of a heater holding member, first heat sensitive bodies, and second heat sensitive bodies according to the present embodiment.

Next, the heating section 90 is described with reference to FIGS. 5 to 8. FIG. 5 is a perspective view of the heater holding member 503, first heat sensitive bodies SM1, and second heat sensitive bodies SM2.

As illustrated in FIG. 5, the heating section 90 further includes at least one first heat sensitive body SM1 and at least one second heat sensitive body SM2. In the present embodiment, the heating section 90 includes a plurality of first heat sensitive bodies SM1 and a plurality of second heat sensitive bodies SM2. Specifically, the heating section 90 includes two first heat sensitive bodies SM1 and three second heat sensitive bodies SM2. The second heat sensitive bodies SM2 differ from the first heat sensitive bodies SM1. Each of the first heat sensitive bodies SM1 and the second heat sensitive bodies SM2 extends in the first direction D1. That is, the length of the first heat sensitive bodies SM1 in the first direction D1 is longer than the length of the first heat sensitive bodies SM1 in the conveyance direction DC of the sheet S. The length of the second heat sensitive bodies SM2 in the first direction D1 is also longer than the length of the second heat sensitive bodies SM2 in the conveyance direction DC of the sheet S.

The first heat sensitive bodies SM1 and the second heat sensitive bodies SM2 are arranged on the heater holding member 503. Specifically, the first heat sensitive bodies SM1 and the second heat sensitive bodies SM2 are arranged on the first surface F1 of the heater holding member 503. Although not shown in FIG. 5, the heater holding member 503 has a plurality of openings corresponding to respective first heat sensitive bodies SM1 and second heat sensitive bodies SM2. A detecting section of a first heat sensitive body SM1 is inserted into an opening of the heater holding member 503 to face and make contact with the heater HT. Similarly, a detecting section of a second heat sensitive body SM2 is inserted into an opening of the heater holding member 503 to face and make contact with the heater HT.

In the following, one of the first heat sensitive bodies SM1 may be referred to as a "first heat sensitive body SM11", and another one of the first heat sensitive bodies SM1 may be referred to as a "first heat sensitive body SM12". Furthermore, one of the second heat sensitive bodies SM2 may be referred to as a "second heat sensitive body SM21", another one of the second heat sensitive bodies SM2 may be referred to as a "second heat sensitive body SM22", and yet another one of the second heat sensitive bodies SM2 may be referred to as a "second heat sensitive body SM23". The first heat sensitive body SM11 and the second heat sensitive body SM21 constitute a heat sensitive unit UT1.

The heat sensitive unit UT1, the first heat sensitive body SM12, the second heat sensitive body SM22, and the second heat sensitive body SM23 are arranged on the first surface F1 of the heater holding member 503 in a substantially straight line in the first direction D1.

Figure 6:
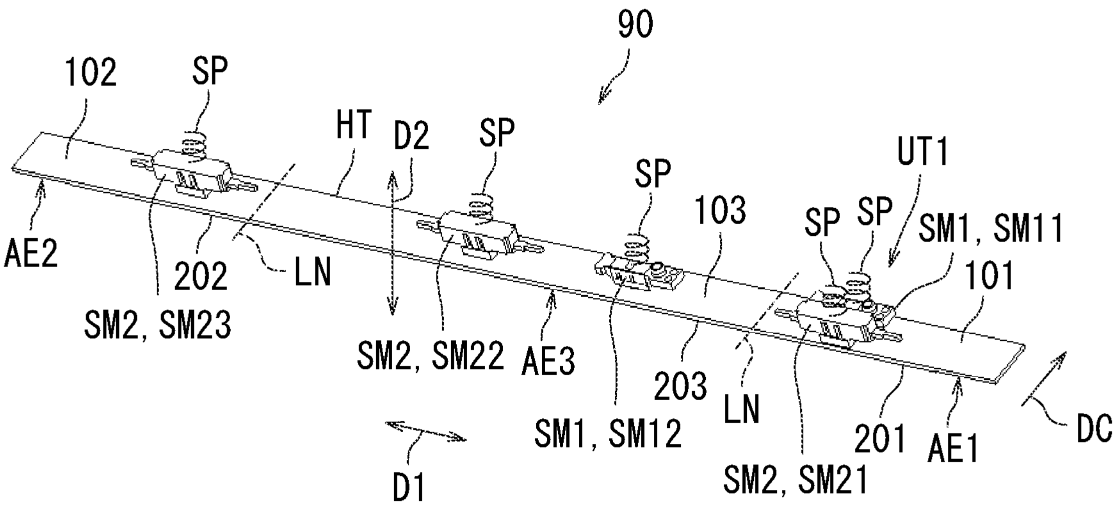
FIG. 6 is a perspective view of a heater, the first heat sensitive bodies, and the second heat sensitive bodies according to the present embodiment.

FIG. 6 is a perspective view of the heater HT, the first heat sensitive bodies SM1, and the second heat sensitive bodies SM2. FIG. 6 illustrates a state in which the heater holding member 503 in FIG. 5 has been removed.

As illustrated in FIG. 6, each of the first heat sensitive bodies SM1 and the second heat sensitive bodies SM2 senses heat from the heater HT. In the present embodiment, each of the first heat sensitive bodies SM1 and the second heat sensitive bodies SM2 detect the temperature of the heater HT.

The heater HT is flat, and is an elongated thin plate. The heater HT extends in the first direction D1. Accordingly, the first direction D1 indicates the longitudinal direction of the heater HT. The heater HT is a ceramic heater, for example. The thickness of the heater HT is approximately 1 mm, for example.

The heater HT has a first heater portion AE1. The heater HT preferably further has a second heater portion AE2 and a third heater portion AE3. For ease of understanding, the boundary between the first heater portion AE1 and the third heater portion AE3 and the boundary between the second heater portion AE2 and the third heater portion AE3 are each indicated by a dotted line LN in FIG. 6.

The first heater portion AE1 is one end portion of a pair of end portions of the heater HT in the first direction D1. The heat sensitive unit UT1 faces the first heater portion AE1 in the second direction D2.

Figure 7:
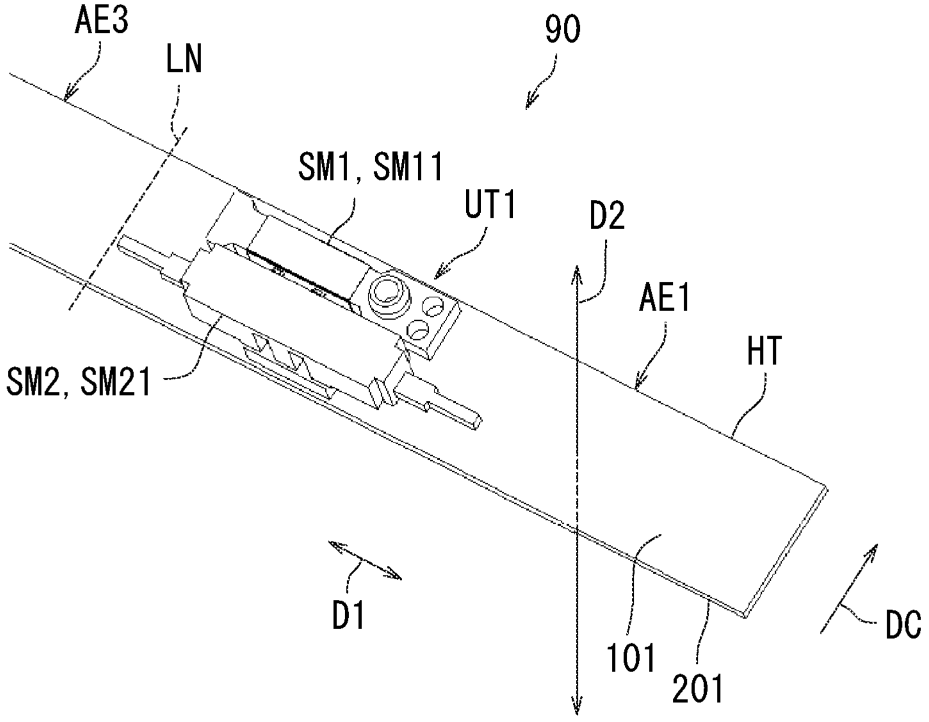
FIG. 7 is a perspective view of a heat sensitive unit and a first heater portion according to the present embodiment.

FIG. 7 is a perspective view of the heat sensitive unit UT1 and the first heater portion AE1. FIG. 7 illustrates an enlargement of the heat sensitive unit UT1 and the first heater portion AE1 in FIG. 6.

As illustrated in FIG. 7, the first heat sensitive body SM11 and the second heat sensitive body SM21 constituting the heat sensitive unit UT1 face the first heater portion AE1 in the second direction D2. In the present embodiment, the first heat sensitive body SM11 and the second heat sensitive body SM21 are in contact with the first heater portion AE1. The first heat sensitive body SM11 and the second heat sensitive body SM21 sense heat from the first heater portion AE1. Specifically, the first heat sensitive body SM11 and the second heat sensitive body SM21 detect the temperature of the first heater portion AE1.

The first heat sensitive body SM11 and the second heat sensitive body SM21 are aligned in the conveyance direction DC of the sheet S. Therefore, according to the present embodiment, the first heat sensitive body SM11 or the second heat sensitive body SM21 can be prevented from being installed outside the fixing belt 70 (FIG. 2) in the first direction D1, and both the first heat sensitive body SM11 and the second heat sensitive body SM21 can be installed inside the fixing belt 70. That is, in the present embodiment, even when the length of the first heater portion AE1 in the first direction D1 is comparatively short, the heat sensitive bodies (first heat sensitive body SM11 and second heat sensitive body SM21) can be installed inside the fixing belt 70 without installing a heat sensitive body outside the fixing belt 70. Accordingly, the work of installing the heat sensitive bodies (first heat sensitive body SM11 and second heat sensitive body SM21) is simple compared to a case in which a heat sensitive body is installed outside the fixing belt. Furthermore, it is not necessary to secure a space to install a heat sensitive body outside the fixing belt 70.

For example, in a case in which the length of the first heater portion AE1 in the first direction D1 is comparatively short, it may not be possible to install the first heat sensitive body SM11 or the second heat sensitive body SM21 inside the fixing belt 70 and the first heat sensitive body SM11 or the second heat sensitive body SM21 may need to be installed outside the fixing belt 70 when the first heat sensitive body SM11 and the second heat sensitive body SM21 are arranged in a substantially straight line in the first direction D1.

Figure 8:
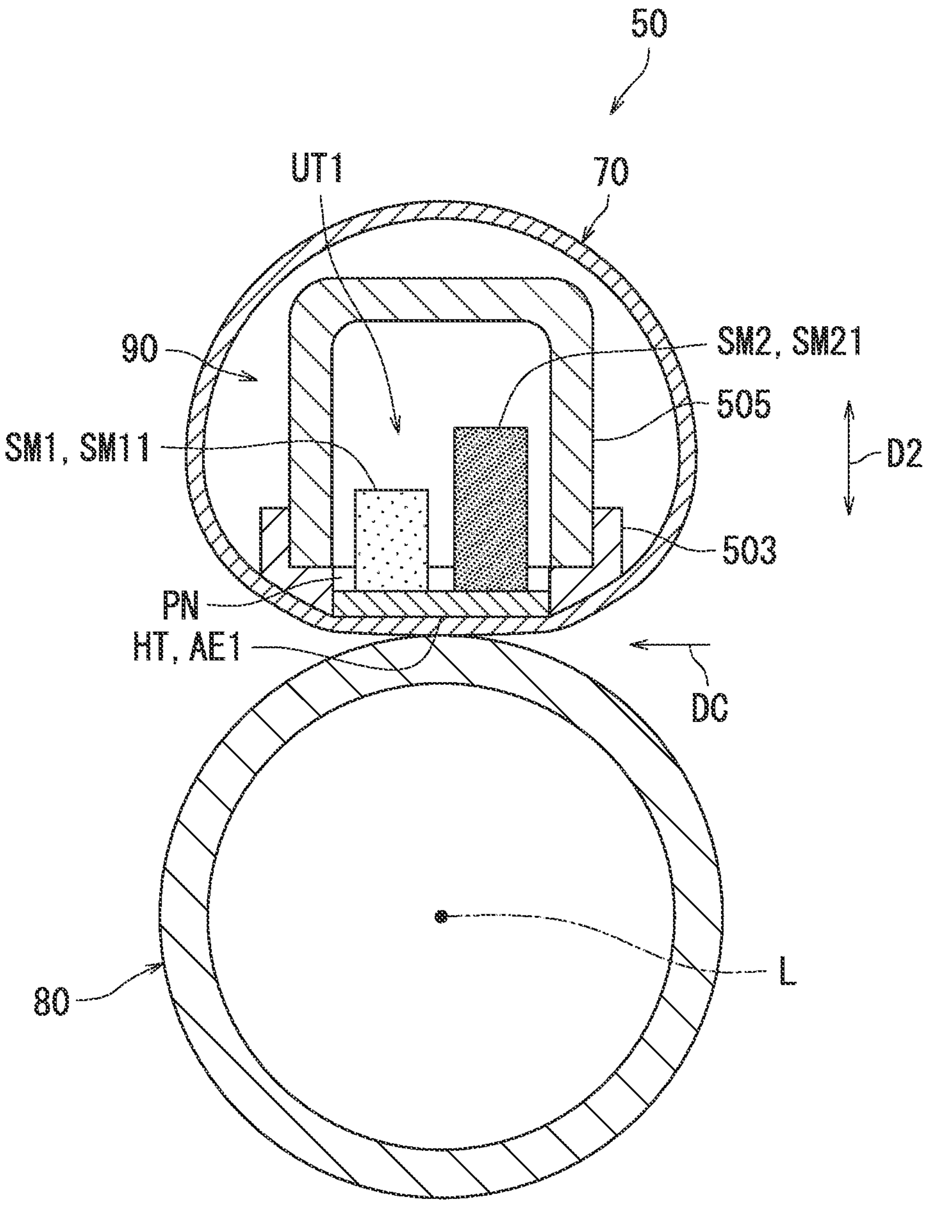
FIG. 8 is a cross-sectional view taken along a line VIII-VIII in FIG. 2.

FIG. 8 is a cross-sectional view taken along a line VIII-VIII in FIG. 2. In FIG. 8, the internal structure of the pressure member 80 is omitted to simplify the drawing.

As illustrated in FIG. 8, the first heat sensitive body SM11 is arranged farther downstream in the conveyance direction DC of the sheet S than the second heat sensitive body SM21. Note that the first heat sensitive body SM11 may be arranged farther upstream in the conveyance direction DC of the sheet S than the second heat sensitive body SM21.

The heater holding member 503 has an opening PN. The first heat sensitive body SM11 and the second heat sensitive body SM21 face and are in contact with the first heater portion AE1 of the heater HT through the opening PN. In the example of FIG. 8, the opening PN is formed as a single opening which combines an opening corresponding to the first heat sensitive body SM11 and an opening corresponding to the second heat sensitive body SM21.

Returning to FIG. 6, the first heater portion AE1 has a first facing surface 101 and a first heater surface 201. The first facing surface 101 and the first heater surface 201 are substantially orthogonal to the second direction D2. The first facing surface 101 faces the first heat sensitive body SM11 and the second heat sensitive body SM21 in the second direction D2. The first heater surface 201 faces the first facing surface 101 in the second direction D2.

The second heater portion AE2 is the other end portion of the pair of end portions of the heater HT in the first direction D1. The second heat sensitive body SM23 faces the second heater portion AE2 in the second direction D2. In the present embodiment, the second heat sensitive body SM23 is in contact with the second heater portion AE2. Specifically, the second heat sensitive body SM23 faces and is in contact with the second heater portion AE2 through an opening (not illustrated) in the heater holding member 503 (FIG. 5). The second heat sensitive body SM23 senses heat from the second heater portion AE2. Specifically, the second heat sensitive body SM23 detects the temperature of the second heater portion AE2.

The second heater portion AE2 has a second facing surface 102 and a second heater surface 202. The second facing surface 102 and the second heater surface 202 are substantially orthogonal to the second direction D2. The second facing surface 102 faces the second heat sensitive body SM23 in the second direction D2. The second heater surface 202 faces the second facing surface 102 in the second direction D2.

The length of the second heater portion AE2 in the first direction D1 is substantially equal to the length of the first heater portion AE1 in the first direction D1.

The third heater portion AE3 is a portion of the heater HT positioned between the first heater portion AE1 and the second heater portion AE2. The length of the third heater portion AE3 in the first direction D1 is longer than the length of the first heater portion AE1 in the first direction D1 and the length of the second heater portion AE2 in the first direction D1.

The first heat sensitive body SM12 and the second heat sensitive body SM22 face the third heater portion AE3 in the second direction D2. In the present embodiment, the first heat sensitive body SM12 and the second heat sensitive body SM22 are in contact with the third heater portion AE3. Specifically, the first heat sensitive body SM12 faces and is in contact with the third heater portion AE3 through an opening (not illustrated) in the heater holding member 503 (FIG. 5). The second heat sensitive body SM22 also faces and is in contact with the third heater portion AE3 through an opening (not illustrated) in the heater holding member 503. The first heat sensitive body SM12 and the second heat sensitive body SM22 sense heat from the third heater portion AE3. Specifically, the first heat sensitive body SM12 and the second heat sensitive body SM22 detect the temperature of the third heater portion AE3.

The first heat sensitive body SM12 and the second heat sensitive body SM22 are aligned in the first direction D1. In particular, in the present embodiment, the first heat sensitive body SM12 and the second heat sensitive body SM22 can be easily arranged in the first direction D1 because the length of the third heater portion AE3 in the first direction D1 is long. Specifically, the first heat sensitive body SM12 and the second heat sensitive body SM22 are aligned in a substantially straight line in the first direction D1.

The first heat sensitive body SM12 is arranged in a position that is closer to the first heater portion AE1 than the second heat sensitive body SM22. The second heat sensitive body SM22 is arranged in a position that is closer to the second heater portion AE2 than the first heat sensitive body SM12. Note that the first heat sensitive body SM12 may be arranged in a position that is closer to the second heater portion AE2 than the second heat sensitive body SM22. The second heat sensitive body SM22 may also be arranged in a position that is closer to the first heater portion AE1 than the first heat sensitive body SM12.

The third heater portion AE3 has a third facing surface 103 and a third heater surface 203. The third facing surface 103 and the third heater surface 203 are substantially orthogonal to the second direction D2. The third facing surface 103 faces the first heat sensitive body SM12 and the second heat sensitive body SM22 in the second direction D2. The third heater surface 203 faces the third facing surface 103 in the second direction D2.

The first heater portion AE1, the third heater portion AE3, and the second heater portion AE2 are arranged in a substantially straight line in the first direction D1. The total length of the length of the first heater portion AE1 in the first direction D1, the length of the third heater portion AE3 in the first direction D1, and the length of the second heater portion AE2 in the first direction D1 is substantially equal to the width of the sheet S at a maximum size. For example, the maximum size is A3 size, and the width of the sheet S at the maximum size indicates the length of the short side of the sheet S at A3 size. The length of the third heater portion AE3 in the first direction D1 is substantially equal to the width of the sheet S at a size smaller than the maximum size. For example, the size smaller than the maximum size is B5 size, and the width of the sheet S at the size smaller than the maximum size indicates the length of the short side of the sheet S at B5 size.

A first heat sensitive body SM1 and a second heat sensitive body SM2 are described with further reference to FIG. 6.

The first heat sensitive body SM1 includes a thermistor.

The thermistor is a semiconductor element which measures the temperature of the heater HT. The image forming apparatus 1 controls the heater HT based on the temperature measured by the thermistor. The precision by which the temperature of the heater is controlled can be improved due to the first heat sensitive body SM1 being a thermistor.

The second heat sensitive body SM2 includes a thermal cutoff or a thermostat.

The thermal cutoff is a protective element such as a one-shot thermostat. The thermal cutoff shuts off the supply of electricity to the heater HT when the temperature of the heater HT is equal to or greater than a threshold. In particular, in the thermal cutoff, once the supply of electricity is shut off according to the temperature of the heater HT, the supply of electricity is not restored. Accordingly, when the temperature of the heater HT has risen excessively, the precision by which heating of the fixing belt 70 by the heater HT is stopped can be improved.

The thermostat shuts off the supply of electricity to the heater HT when the temperature of the heater HT is equal to or greater than a threshold, and restores the supply of electricity to the heater HT when the temperature of the heater HT is less than the threshold. Accordingly, the heating of the fixing belt 70 by the heater HT can be turned on and off with fine precision corresponding to temperature changes in the heater HT.

Here, as illustrated in FIG. 6, the heating section 90 further includes a plurality of urging members SP. In the present embodiment, the urging members SP are arranged corresponding to the first heat sensitive bodies SM1 and the second heat sensitive bodies SM2. Each of the first heat sensitive bodies SM1 and the second heat sensitive bodies SM2 is directly or indirectly urged toward the heater HT by a corresponding urging member SP. Specifically, each of the first heat sensitive bodies SM1 and the second heat sensitive bodies SM2 is directly or indirectly urged toward the heater HT by a corresponding urging member SP because the reinforcing member 505 (FIG. 3) presses against the urging members SP. The urging members SP are coil springs, for example.

Figure 9:
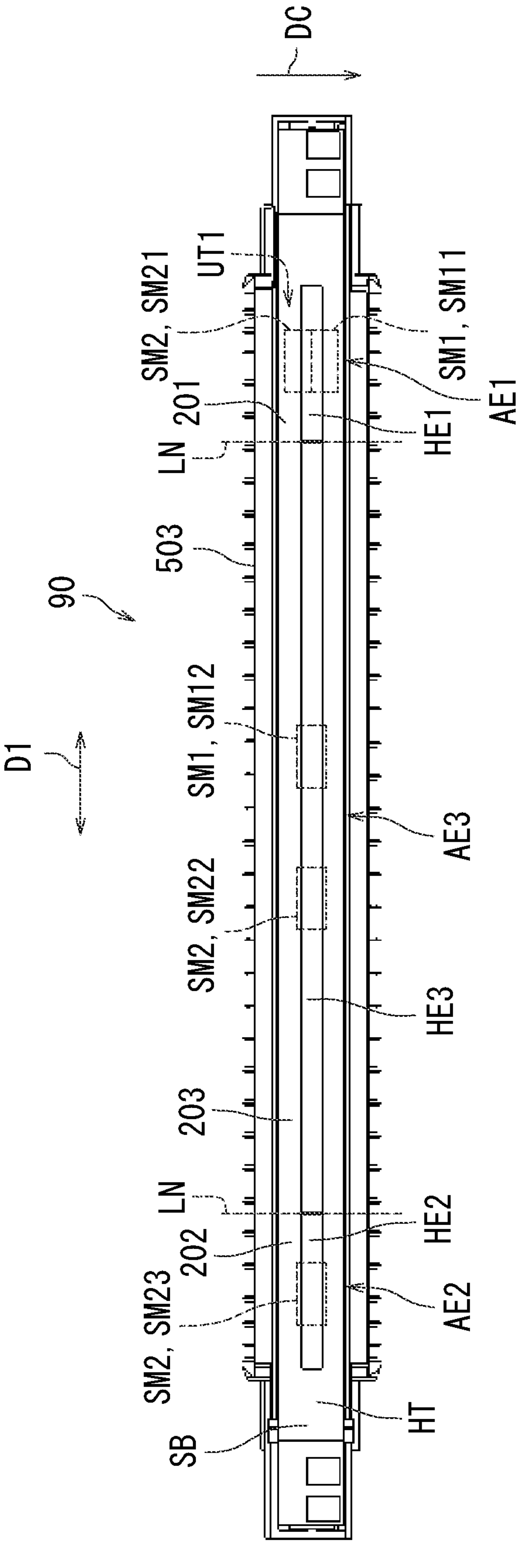
FIG. 9 is a plan view of the heater holding member and the heater according to the present embodiment as viewed from a side of a pressure member.

Next, the heater HT is described with reference to FIG. 9. FIG. 9 is a plan view of the heater holding member 503 and the heater HT as viewed from a side of the pressure member 80 (FIG. 4). For ease of understanding, the boundary between the first heater portion AE1 and the third heater portion AE3 and the boundary between the second heater portion AE2 and the third heater portion AE3 are each indicated by a dotted line LN in FIG. 9.

As illustrated in FIG. 9, the heater HT includes a substrate SB, a first resistance heating element HE1, a second resistance heating element HE2, and a third resistance heating element HE3. The first resistance heating element HE1 corresponds to an example of a "first heating element", the second resistance heating element HE2 corresponds to an example of a "second heating element", and the third resistance heating element HE3 corresponds to an example of a "third heating element".

The substrate SB is flat and is an elongated thin plate. The substrate SB extends in the first direction D1. The substrate SB is a ceramic substrate, for example.

The first resistance heating element HE1, the second resistance heating element HE2, and the third resistance heating element HE3 extend in the first direction D1. The first resistance heating element HE1, the second resistance heating element HE2, and the third resistance heating element HE3 are arranged in a substantially straight line in the first direction D1. The third resistance heating element HE3 is arranged between the first resistance heating element HE1 and the second resistance heating element HE2.

Each of the first resistance heating element HE1, the second resistance heating element HE2, and the third resistance heating element HE3 generate heat when electricity is supplied thereto. That is, each of the first resistance heating element HE1, the second resistance heating element HE2, and the third resistance heating element HE3 generates heat when energized.

The first resistance heating element HE1 is arranged on the first heater surface 201 of the first heater portion AE1. Accordingly, the first heat sensitive body SM11 and the second heat sensitive body SM21 sense the heat caused by the first resistance heating element HE1. That is, the first heat sensitive body SM11 and the second heat sensitive body SM21 detect the temperature of the first heater portion AE1 caused by the first resistance heating element HE1.

The second resistance heating element HE2 is arranged on the second heater surface 202 of the second heater portion AE2. Accordingly, the second heat sensitive body SM23 senses the heat caused by the second resistance heating element HE2. That is, the second heat sensitive body SM23 detects the temperature of the second heater portion AE2 caused by the second resistance heating element HE2.

The third resistance heating element HE3 is arranged on the third heater surface 203 of the third heater portion AE3. Accordingly, the first heat sensitive body SM12 and the second heat sensitive body SM22 sense the heat caused by the third resistance heating element HE3. That is, the first heat sensitive body SM12 and the second heat sensitive body SM22 detect the temperature of the third heater portion AE3 caused by the third resistance heating element HE3.

The first resistance heating element HE1, the second resistance heating element HE2, and the third resistance heating element HE3 can be controlled separately from each other. Therefore, according to the present embodiment, the on/off state of the first resistance heating element HE1, the second resistance heating element HE2, and the third resistance heating element HE3 can be controlled according to the size of the sheet S. As a result, when the size of the sheet S is small, temperature increase of the first heater portion AE1 and the second heater portion AE2 can be inhibited by turning off the first resistance heating element HE1 and the second resistance heating element HE2.

For example, when the width of the sheet S is substantially equal to the total length of the length of the first heater portion AE1 in the first direction D1, the length of the third heater portion AE3 in the first direction D1, and the length of the second heater portion AE2 in the first direction D1, the first resistance heating element HE1, the second resistance heating element HE2, and the third resistance heating element HE3 are all turned on.

For example, when the width of the sheet S is substantially equal to the length of the third heater portion AE3 in the first direction D1, the first resistance heating element HE1 and the second resistance heating element HE2 are turned off and the third resistance heating element HE3 is turned on.

In the present embodiment, the second heat sensitive body SM21 is arranged corresponding to the first resistance heating element HE1 and the first heater portion AE1, the second heat sensitive body SM23 is arranged corresponding to the second resistance heating element HE2 and the second heater portion AE2, and the second heat sensitive body SM22 is arranged corresponding to the third resistance heating element HE3 and the third heater portion AE3. Accordingly, when the second heat sensitive bodies SM21 to SM23 are thermal cutoffs or thermostats, the supply of electricity can be shut off when the temperature is equal to or greater than a threshold for each of the first to third resistance heating elements HE1 to HE3.

Specifically, the second heat sensitive body SM21 shuts off the supply of electricity to the first resistance heating element HE1 when the temperature of the first heater portion AE1 is equal to or greater than the threshold. The second heat sensitive body SM23 shuts off the supply of electricity to the second resistance heating element HE2 when the temperature of the second heater portion AE2 is equal to or greater than the threshold. The second heat sensitive body SM22 shuts off the supply of electricity to the third resistance heating element HE3 when the temperature of the third heater portion AE3 is equal to or greater than the threshold.

Furthermore, in the present embodiment, when the first heat sensitive body SM11 is a thermistor, the first heat sensitive body SM11 can control the supply of electricity to the first resistance heating element HE1 and the second resistance heating element HE2 according to the temperature of the first heater portion AE1 detected by the first heat sensitive body SM11. Also, when the first heat sensitive body SM12 is a thermistor, the first heat sensitive body SM12 can control the supply of electricity to the third resistance heating element HE3 according to the temperature of the third heater portion AE3 detected by the first heat sensitive body SM12.

(Variation)

A fixing device 50 according to a variation of the embodiment of the present invention is described with reference to FIG. 10. The fixing device 50 according to the variation mainly differs from the fixing device 50 according to the present embodiment described with reference to FIGS. 1 to 9 by including three first heat sensitive bodies SM1. The following mainly describes the differences between the variation and the present embodiment.

Figure 10:
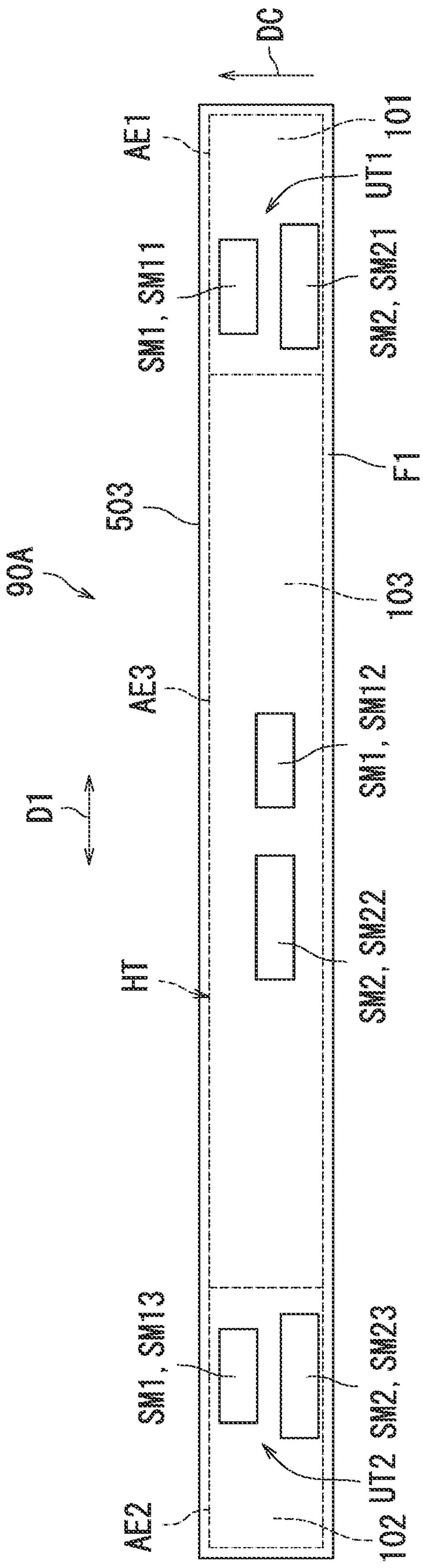
FIG. 10 is a plan view of a heating section according to a variation of the present embodiment.

FIG. 10 is a plan view of a heating section 90A of the fixing device 50 according to the variation of the present embodiment. FIG. 10 is a plan view of the heater holding member 503 and the heater HT as viewed from a side of the reinforcing member 505 (FIG. 4).

As illustrated in FIG. 10, the heating section 90A further includes a first heat sensitive body SM13 in addition to the configuration of the heating section 90 described with reference to FIGS. 3 to 9. The first heat sensitive body SM13 is yet another one of the first heat sensitive bodies SM1. The first heat sensitive body SM13 is arranged on the first surface F1 of the heater holding member 503. The first heat sensitive body SM13 and the second heat sensitive body SM23 constitute a heat sensitive unit UT2.

The first heat sensitive body SM13 and the second heat sensitive body SM23 constituting the heat sensitive unit UT2 face the second heater portion AE2 in the second direction D2 (FIG. 4). In the variation, the first heat sensitive body SM13 and the second heat sensitive body SM23 are in contact with the second heater portion AE2. The first heat sensitive body SM13 and the second heat sensitive body SM23 sense heat from the second heater portion AE2. Specifically, the first heat sensitive body SM13 and the second heat sensitive body SM23 detect the temperature of the second heater portion AE2.

The first heat sensitive body SM13 and the second heat sensitive body SM23 are aligned in the conveyance direction DC of the sheet S. Therefore, according to the variation of the present embodiment, the first heat sensitive body SM13 or the second heat sensitive body SM23 can be prevented from being installed outside the fixing belt 70 (FIG. 2) in the first direction D1, and both the first heat sensitive body SM13 and the second heat sensitive body SM23 can be installed inside the fixing belt 70. That is, in the variation, even when the length of the second heater portion AE2 in the first direction D1 is comparatively short, the heat sensitive bodies (first heat sensitive body SM13 and second heat sensitive body SM23) can be installed inside the fixing belt 70 without installing a heat sensitive body outside the fixing belt 70. Accordingly, the work of installing the heat sensitive bodies (first heat sensitive body SM13 and second heat sensitive body SM23) is simple compared to a case in which a heat sensitive body is installed outside the fixing belt. Furthermore, it is not necessary to secure a space to install a heat sensitive body outside the fixing belt 70.

Specifically, the first heat sensitive body SM13 is arranged farther downstream in the conveyance direction DC of the sheet S than the second heat sensitive body SM23. Note that the first heat sensitive body SM13 may be arranged farther upstream in the conveyance direction DC of the sheet S than the second heat sensitive body SM23.

The second facing surface 102 of the second heater portion AE2 faces the first heat sensitive body SM13 and the second heat sensitive body SM23 in the second direction D2.

In particular, in the variation, when the first heat sensitive body SM13 is a thermistor, the first heat sensitive body SM13 can control the supply of electricity to the second resistance heating element HE2 (FIG. 9) according to the temperature of the second heater portion AE2 detected by the first heat sensitive body SM13. Furthermore, when the first heat sensitive body SM11 is a thermistor, the first heat sensitive body SM11 can control the supply of electricity to the first resistance heating element HE1 (FIG. 9) according to the temperature of the first heater portion AE1 detected by the first heat sensitive body SM11.

Note that the first heat sensitive body SM13 and the second heat sensitive body SM23 face and are in contact with the second heater portion AE2 of the heater HT through an opening (not illustrated) in the heater holding member 503. The opening in this case is formed as a single opening which combines an opening corresponding to the first heat sensitive body SM13 and an opening corresponding to the second heat sensitive body SM23.

An embodiment of the present invention is described above with reference to the accompanying drawings. However, the present invention is not limited to the above embodiment and may be implemented in various manners within a scope not departing from the gist thereof. Furthermore, the plurality of constituent elements disclosed in the above embodiment may be appropriately modified. For example, some of the entirety of constituent elements illustrated in the embodiment may be added to constituent elements of another embodiment, or some of the entirety of constituent elements illustrated in the embodiment may be deleted from the embodiment.

In order to facilitate understanding of the invention, the drawings mainly illustrate the respective constituent elements schematically. Aspects such as thickness, length, number, and interval of the constituent elements illustrated in the drawings may differ in practice for convenience of drawing preparation. Furthermore, it need not be stated that the configuration of the constituent elements illustrated in the above embodiment is an example and is not particularly limited, and that various alterations are possible within a scope not substantially departing from the effects of the present invention.

(1) In the present embodiment and the variation described with reference to FIGS. 1 to 10, the heater HT has three heater portions (first to third heater portions AE1 to AE3), but the heater HT may have two heater portions or four or more heater portions. The heater HT then includes the same number of resistance heating elements as the number of heater portions. Furthermore, the first heat sensitive bodies SM1 and the second heat sensitive bodies SM2 may be arranged corresponding to respective heater portions. In this case, in each of the heater portions, a first heat sensitive body SM1 and a second heat sensitive body SM2 may be aligned in the conveyance direction DC of the sheet S. Furthermore, only a first heat sensitive body SM1 may be arranged on one heater portion, or only a second heat sensitive body SM2 may be arranged on one heater portion. It is preferable that a second heat sensitive body SM2 be arranged on each heater portion. A first heat sensitive body SM1 may also be arranged on each heater portion.

(2) In the present embodiment and the variation described with reference to FIGS. 1 to 10, the first heat sensitive body SM12 and the second heat sensitive body SM22 arranged corresponding to the third heater portion AE3 may be aligned in the conveyance direction DC of the sheet S.

(3) In the present embodiment and the variation described with reference to FIGS. 1 to 10, a multifunction peripheral is described as an example of the image forming apparatus 1. However, the image forming apparatus 1 is not limited to a multifunction peripheral and need only include at least one of a copy function, a printer function, and a facsimile machine function, for example. The image forming apparatus 1 was also a monochrome multifunction peripheral, but the present invention is not limited as such. The image forming apparatus 1 may be a color multifunction peripheral, for example.

INDUSTRIAL APPLICABILITY

The present invention relates to a fixing device and an image forming apparatus, and has industrial applicability.

The invention claimed is:

1. A fixing device which fixes a toner image formed on a sheet to the sheet, the fixing device comprising:
a fixing belt;
a pressure member configured to pressibly make contact with the fixing belt and rotate around an axis of rotation; and
a heating section which faces an inner peripheral surface of the fixing belt, wherein the heating section includes:
a heater which heats the fixing belt;
a heater holding member which holds the heater;
a plurality of first heat sensitive bodies arranged on the heater holding member; and
a plurality of second heat sensitive bodies arranged on the heater holding member, the second heat sensitive bodies differing from the first heat sensitive bodies in whether or not to restore supply of electricity after shutting of the supply of electricity to the heater,
the heater has:
a first heater portion which is one end portion of a pair of end portions of the heater in a longitudinal direction thereof;
a second heater portion which is another end portion of the pair of end portions of the heater; and
a third heater portion which is a portion of the heater positioned between the first heater portion and the second heater portion,
the first heat sensitive bodies include two first heat sensitive bodies,
the second heat sensitive bodies include three second heat sensitive bodies,
one of the two first heat sensitive bodies and one of the three second heat sensitive bodies face the first heater portion and are aligned in a conveyance direction of the sheet,
another one of the two first heat sensitive bodies and another one of the three second heat sensitive bodies face the third heater portion and are aligned in a direction in which the axis of rotation extends,
yet another one of the three second heat sensitive bodies faces the second heater portion,
the first heat sensitive bodies include an additional first sensitive body in addition to the two first heat sensitive bodies, and
the additional first heat sensitive body and the yet another one of the second heat sensitive bodies face the second heater portion and are aligned in the conveyance direction of the sheet.

2. The fixing device according to claim 1, wherein
the heater includes a first heating element, a second heating element, and a third heating element which are controllable separately from each other,
the first heater portion has:

a first facing surface which faces one of the first heat sensitive bodies and one of the second heat sensitive bodies; and
a first heater surface which faces the first facing surface and on which the first heating element is arranged,
the third heater portion has:
a third facing surface which faces one of the first heat sensitive bodies and one of the second heat sensitive bodies; and
a third heater surface which faces the third facing surface and on which the third heating element is arranged, and
the second heater portion has:
a second facing surface which faces one of the second heat sensitive bodies; and
a second heater surface which faces the second facing surface and on which the second heating element is arranged.

3. The fixing device according to claim 1, wherein
the first heat sensitive bodies each include a thermistor,
the second heat sensitive bodies each include a thermal cutoff or a thermostat,
the thermistor measures a temperature of the heater,
the thermal cutoff shuts off the supply of electricity to the heater when the temperature of the heater is equal to or greater than a threshold, and
the thermostat shuts off the supply of electricity to the heater when the temperature of the heater is equal to or greater than the threshold, and restores the supply of electricity to the heater when the temperature of the heater is less than the threshold.

4. The fixing device according to claim 1, wherein
the first heat sensitive bodies are arranged farther downstream in the conveyance direction of the sheet than the second heat sensitive bodies.

5. The fixing device according to claim 1, wherein
the first heat sensitive bodies and the second heat sensitive bodies extend in a prescribed direction which is substantially orthogonal to the conveyance direction of the sheet,
a length of the first heat sensitive bodies in the prescribed direction is longer than a length of the first heat sensitive bodies in the conveyance direction of the sheet, and
a length of the second heat sensitive bodies in the prescribed direction is longer than a length of the second heat sensitive bodies in the conveyance direction of the sheet.

6. The fixing device according to claim 1, wherein in the third heater portion, the another one of the two first heat sensitive bodies is arranged in a position that is closer to the first heater portion than the another one of the three second heat sensitive bodies, and the another one of the three second heat sensitive bodies is arranged in a position that is closer to the second heater portion than the another one of the two first heat sensitive bodies.

7. An image forming apparatus comprising:
an image forming section configured to form a toner image on a sheet; and
the fixing device according to claim 1, wherein
the fixing device fixes the toner image to the sheet.

* * * * *